(12) United States Patent
    Ophir

(10) Patent No.: US 11,067,814 B2
(45) Date of Patent: Jul. 20, 2021

(54) SMART HEAD-MOUNTED DISPLAY ALIGNMENT SYSTEM AND METHOD

(71) Applicant: ELBIT SYSTEMS LTD., Haifa (IL)

(72) Inventor: Yoav Ophir, Haifa (IL)

(73) Assignee: . ELBITSYSTEMS LTD., Haifa (IL)

( * ) Notice: Subject to any disclaimer, the term of this patent is extended or adjusted under 35 U.S.C. 154(b) by 0 days.

(21) Appl. No.: 17/058,178

(22) PCT Filed: Nov. 20, 2019

(86) PCT No.: PCT/IL2019/051268
    § 371 (c)(1),
    (2) Date: Nov. 24, 2020

(87) PCT Pub. No.: WO2020/115732
    PCT Pub. Date: Jun. 11, 2020

(65) Prior Publication Data
    US 2021/0141232 A1    May 13, 2021

(30) Foreign Application Priority Data
    Dec. 2, 2018    (IL) ........................... 263430

(51) Int. Cl.
    *G02B 27/01*    (2006.01)
(52) U.S. Cl.
    CPC ..... *G02B 27/0179* (2013.01); *G02B 27/0172* (2013.01); *G02B 2027/0187* (2013.01); *G02B 2027/0198* (2013.01)

(58) Field of Classification Search
    None
    See application file for complete search history.

(56) References Cited

U.S. PATENT DOCUMENTS 7,046,215 B1     5/2006   Bartlett
    2010/0109976 A1  5/2010   Gilbert et al.
    2012/0293395 A1  11/2012  Williams
    2014/0168264 A1  6/2014   Harrison et al.
    2015/0002375 A1  1/2015   Williams
    2017/0011555 A1* 1/2017   Li ............................ G06T 1/60
    2017/0090203 A1  3/2017   Mullins et al.
    2019/0129177 A1* 5/2019   Roimi ................ G02B 27/0093
    2019/0236847 A1* 8/2019   Neil ........................ G06T 19/20
    2020/0111256 A1* 4/2020   Bleyer ................ G06F 3/04815

* cited by examiner

*Primary Examiner* — Kristy A Haupt

(57) ABSTRACT

A system comprising a processing resource configured to: obtain a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display; determine which given symbol of the first plurality of symbols was aligned with the second, the given symbol having first orientation data, the second symbol having second orientation data; and perform an alignment of the head-mounting and the head-mounted display at least based on the first orientation data and the second orientation data.

20 Claims, 8 Drawing Sheets

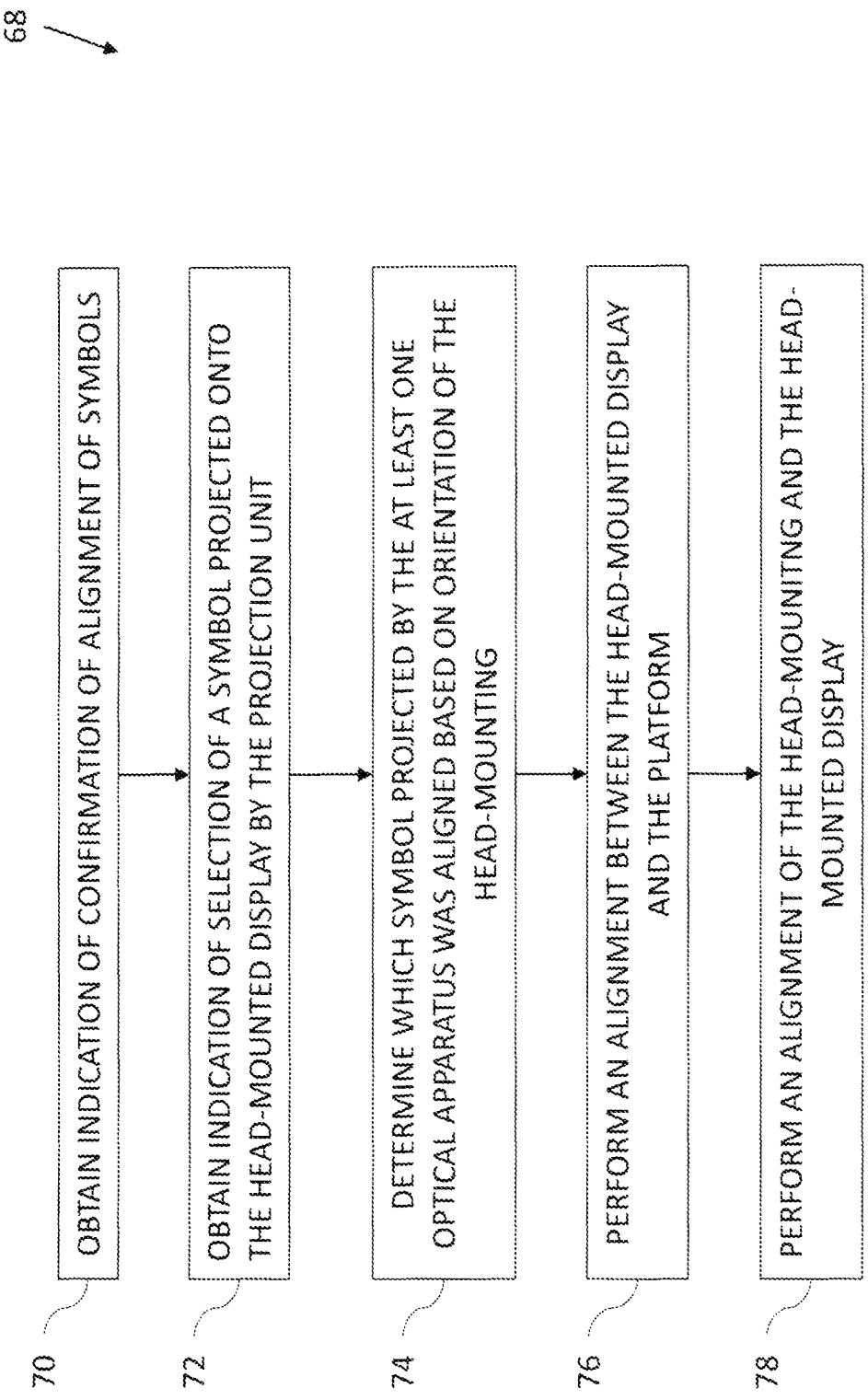

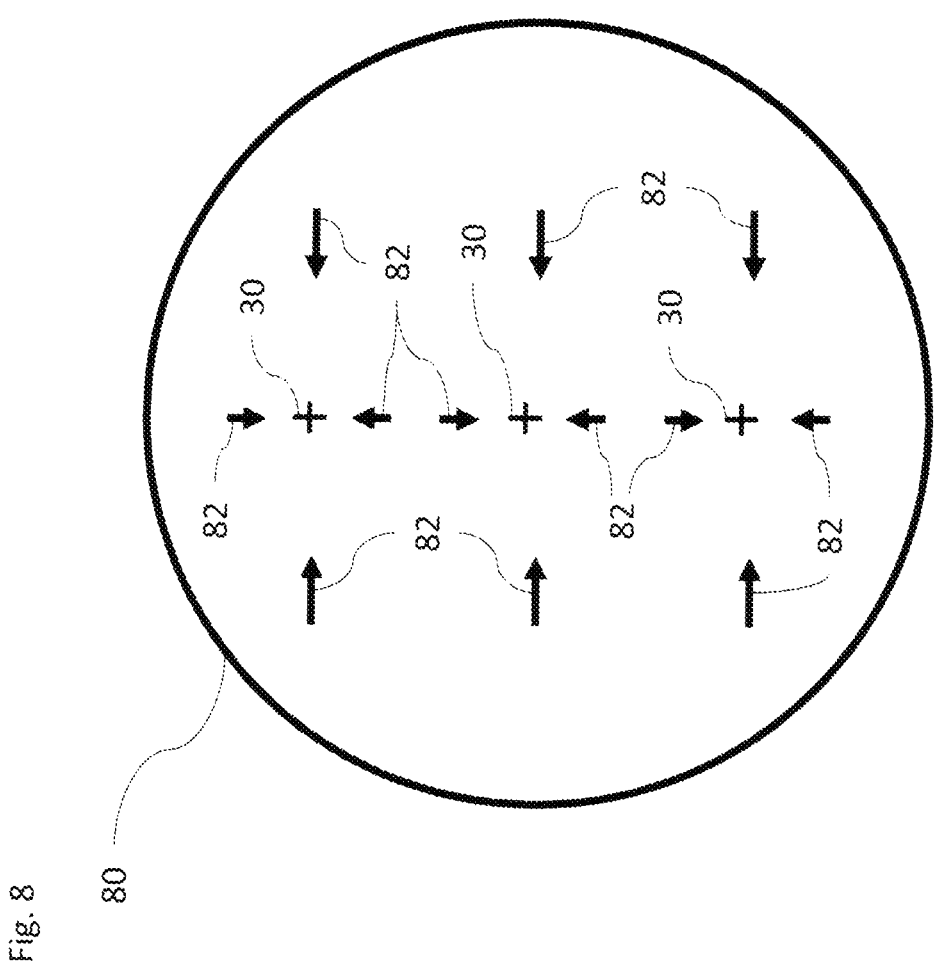

SMART HEAD-MOUNTED DISPLAY ALIGNMENT SYSTEM AND METHOD

TECHNICAL FIELD

The present disclosure generally relates to head-mounted display alignment.

BACKGROUND

A head-mounted display worn by an operator (e.g., a pilot or other driver) of a platform (e.g., an airplane, helicopter, land vehicle, ship or any other mode of transportation) may provide the operator with additional information which is projected into the head-mounted display to augment what the operator can see through the head-mounted display (e.g., the surrounding environment). The additional information may include details about an instrument panel in the platform or about various points of interest which are located outside the platform, by way of example only. The head-mounted display is typically mounted on the head of the operator using a head-mounting, for example, but not limited to, a helmet, a mounting including arms which are supported by the ears of the operator, or any suitable head-mounting. The head-mounting is typically aligned to a coordinate system of the platform based on a tracking system. However, the head-mounted display may be out of alignment with the coordinate system of the head-mounting and the platform for various reasons.

One method used to align the head-mounted display with the platform and therefore the head-mounting, is for the operator to align two symbols in the head-mounted display. One of the symbols is projected by a boresight reticle unit (BRU) or similar optical apparatus disposed on the platform. The other one of the symbols is projected by a projection unit of the head-mounted display. Once the two symbols are aligned, knowledge of the alignment of the symbols may be used to align the head-mounted display with the coordinate system of the platform.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 6,377,401 to BAE Systems PLC describes a head tracker system for determining a user's head orientation relative to a datum comprises: a head mounting, preferably a helmet, for attachment to the user's head and a sensor system for sensing the orientation of the head mounting relative and the datum. A distinguishable marking is provided at a first known point fixed relative to the head mounting or a second known point fixed relative to the datum. At the other known point an optical sensor, preferably a video camera, is mounted. The system further comprises processing means for determining when the marking is within the field of view of the optical sensor and the output of the processing means is used to correct for drift in the sensor system or to provide an independent verification that the system is functioning within preselected tolerances.

U.S. Pat. No. 9,323,056 to BAE Systems PLC describes a method and system of aligning a helmet mounted display mounted to a helmet. A method may comprise aligning a first and a second helmet mounted display guide symbol with a reference direction, respectively; selecting the alignment of the first and second helmet mounted display guide symbol with the reference direction, respectively; aligning a first and a second stabilized guide symbol, starting at positions of the aligned first and second symbols, respectively, with the reference direction, the first and second stabilized symbols being stabilized to reduce the movement of the stabilized symbol with respect to the reference direction in response to movements of the head of the user; selecting the alignment of the first and second stabilized guide symbol with the reference direction, respectively; determining a relative position and orientation between the helmet and the display according to the positions and orientations of the helmet at the alignments.

BRIEF DESCRIPTION OF THE DRAWINGS

The present disclosure will be understood and appreciated more fully from the following detailed description, taken in conjunction with the drawings in which:

FIG. 7 is a flowchart including exemplary steps in the alternative mode of operation of the system of FIG. 1; and FIG. 8 is a view of an alternative reticle for use in the system of FIG. 1.

DESCRIPTION OF EXAMPLE EMBODIMENTS

Overview

Figure 1:
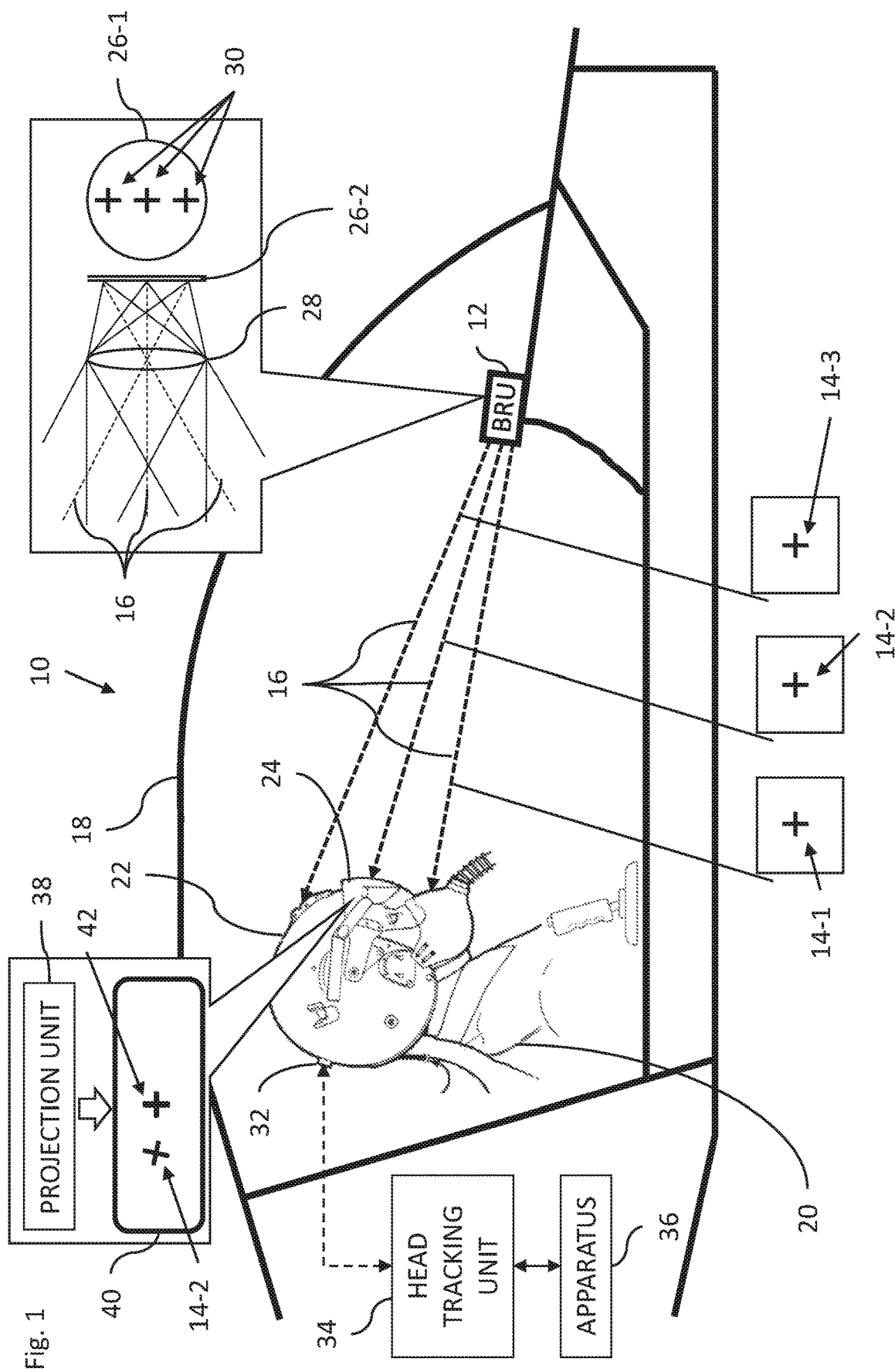
FIG. 1 is a partly pictorial, partly block diagram view of a head-mounted display alignment system constructed and operative in accordance with an embodiment of the present disclosure.

In accordance with a first aspect of the presently disclosed subject matter, there is provided a system comprising a processing resource configured to: obtain a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display; determine which symbol of the first plurality of symbols was aligned by the operator with the second symbol yielding a first symbol of the first plurality of symbols, the first symbol having first orientation data, the second symbol having second orientation data; and perform an alignment of the head-mounting and the head-mounted display at least based on the first orientation data and the second orientation data.

In some cases, the processing resource is further configured to perform another alignment of the head-mounted display and a coordinate system of the platform at least based on the first orientation data and the second orientation data.

In some cases, the processing resource is further configured to obtain third orientation data of the head-mounting from a head tracking unit of the head-mounting; and determine which symbol of the first plurality of symbols was aligned by the operator with the second symbol at least based on the third orientation data of the head-mounting.

In some cases, the processing resource is further configured to: obtain a second indication of a selection by the operator of the second symbol from a second plurality of symbols projected onto the head-mounted display by the projection unit, the selection of the second symbol from the second plurality of symbols indicating that the second symbol matches the first symbol; and determine which symbol of the first plurality of symbols was aligned by the operator with the second symbol at least based on the selection of the second symbol by the operator.

In some cases, each one of the second plurality of symbols has a different format and corresponds to a format of one symbol of the first plurality of symbols projected from the at least one optical apparatus.

In some cases, the format may include at least one of: a color format; or a shape format.

In some cases, the first symbol and the second symbol has a two-dimensional format that allows for roll alignment between the first symbol and the second symbol.

In some cases, the first plurality of symbols are comprised in a plurality of collimated beams.

In some cases, the at least one optical apparatus comprises a boresight reticle unit including at least one of: a lens; or beam splitter configured to generate the first plurality of symbols.

In some cases, the at least one optical apparatus comprises a plurality of boresight reticle units configured to generate the first plurality of symbols.

In some cases, the at least one optical apparatus includes a reticle configured to generate: the first symbol; and a plurality of arrow symbols pointing in a direction of the first symbol to direct the operator to find the first symbol in the head-mounted display.

In accordance with a second aspect of the presently disclosed subject matter, there is provided a method comprising: obtaining a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display; determining which symbol of the first plurality of symbols was aligned by the operator with the second symbol yielding a first symbol of the first plurality of symbols, the first symbol having first orientation data, the second symbol having second orientation data; and performing an alignment of the head-mounting and the head-mounted display at least based on the first orientation data and the second orientation data.

In some cases, the method further comprising performing another alignment of the head-mounted display and a coordinate system of the platform at least based on the first orientation data and the second orientation data.

In some cases, the method further comprising: obtaining third orientation data of the head-mounting from a head tracking unit of the head-mounting; and determining which symbol of the first plurality of symbols was aligned by the operator with the second symbol at least based on the third orientation data of the head-mounting.

In some cases, the method further comprising: obtaining a second indication of a selection by the operator of the second symbol from a second plurality of symbols projected onto the head-mounted display by the projection unit, the selection of the second symbol from the second plurality of symbols indicating that the second symbol matches the first symbol; and determining which symbol of the first plurality of symbols was aligned by the operator with the second symbol at least based on the selection of the second symbol by the operator.

In some cases, each one of the second plurality of symbols has a different format and corresponds to a format of one symbol of the first plurality of symbols projected from the at least one optical apparatus.

In some cases, the format may include at least one of: a color format; or a shape format.

In some cases, the first symbol and the second symbol has a two-dimensional format that allows for roll alignment between the first symbol and the second symbol.

In some cases, the first plurality of symbols are comprised in a plurality of collimated beams.

In accordance with a second aspect of the presently disclosed subject matter, there is provided a software product, comprising a non-transient computer-readable medium in which program instructions are stored, which instructions, when read by a central processing unit (CPU), cause the CPU to: obtain a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display; determine which symbol of the first plurality of symbols was aligned by the operator with the second symbol yielding a first symbol of the first plurality of symbols, the first symbol having first orientation data, the second symbol having second orientation data; and perform an alignment of the head-mounting and the head-mounted display at least based on the first orientation data and the second orientation data.

Detailed Description

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

In practice, some or all of the functions described herein may be combined in a single physical component or, alternatively, implemented using multiple physical components. These physical components may comprise hard-wired (such as a computer specially constructed for the desired purposes) or programmable devices (such as general-purpose computer specially configured for the desired purpose), or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory. The term "non-transitory" is used herein to exclude transitory, propagating signals, but to otherwise include any volatile or non-volatile computer memory technology suitable to the application.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

Figure 3:
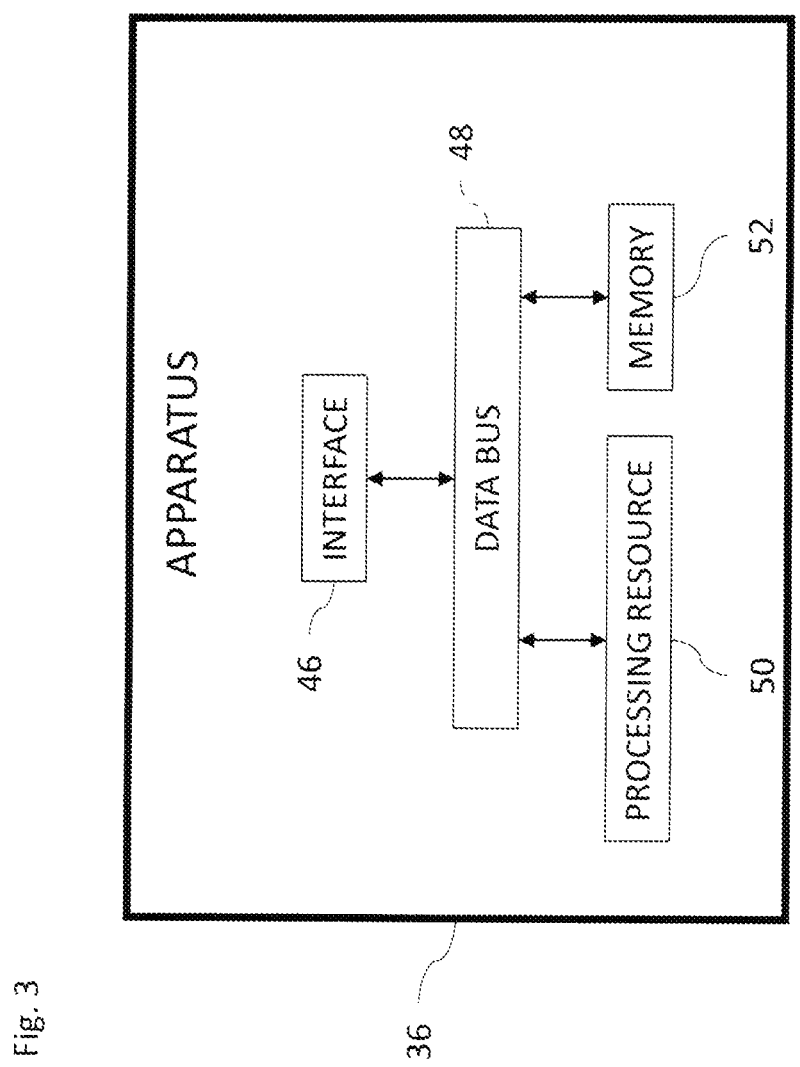
FIG. 3 is a block diagram view of an apparatus for use in the system of FIG. 1.
Figure 4:
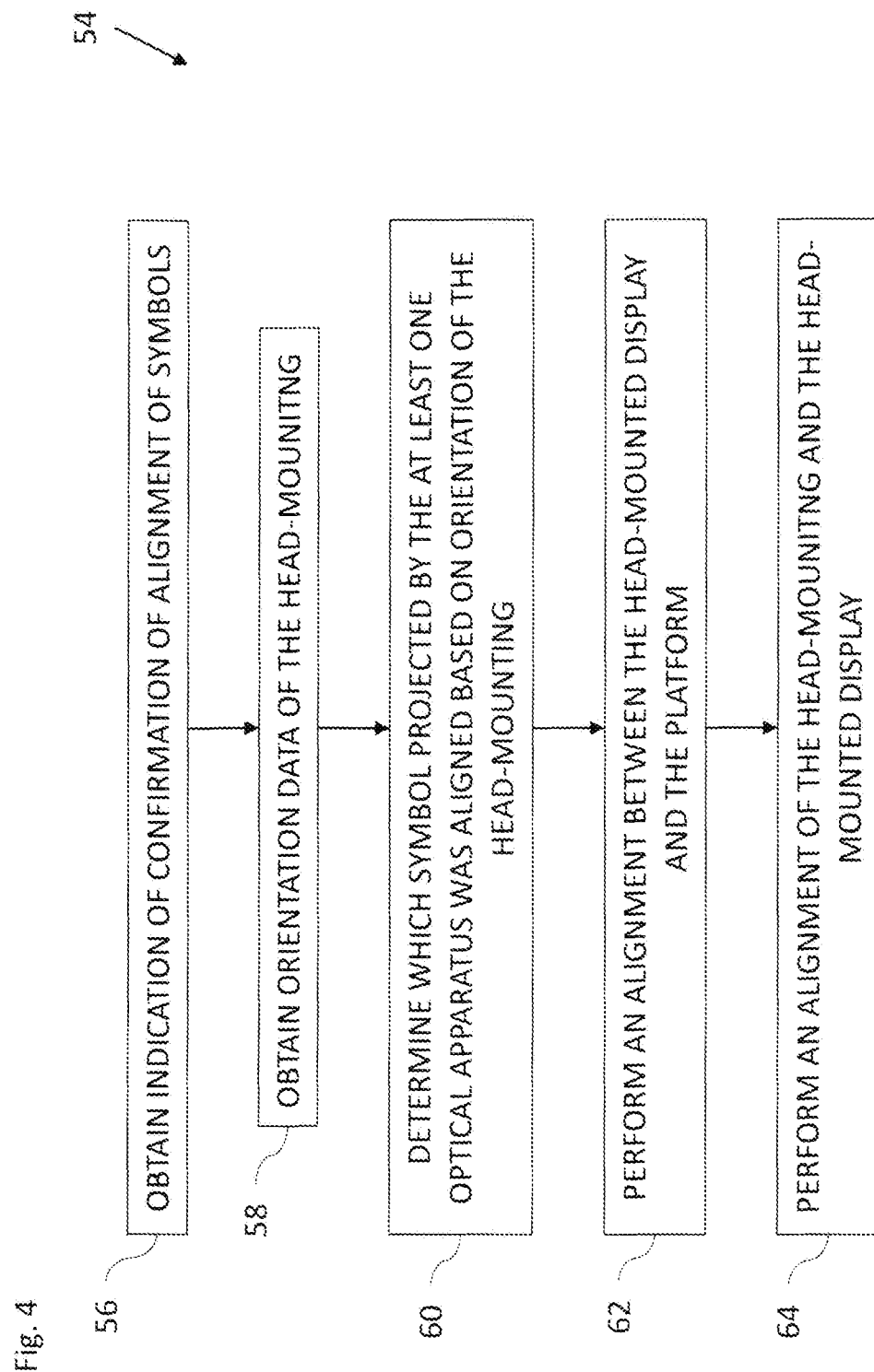
FIG. 4 is a flowchart including exemplary steps in a method of operation of the system of FIG. 1.
Figure 5:
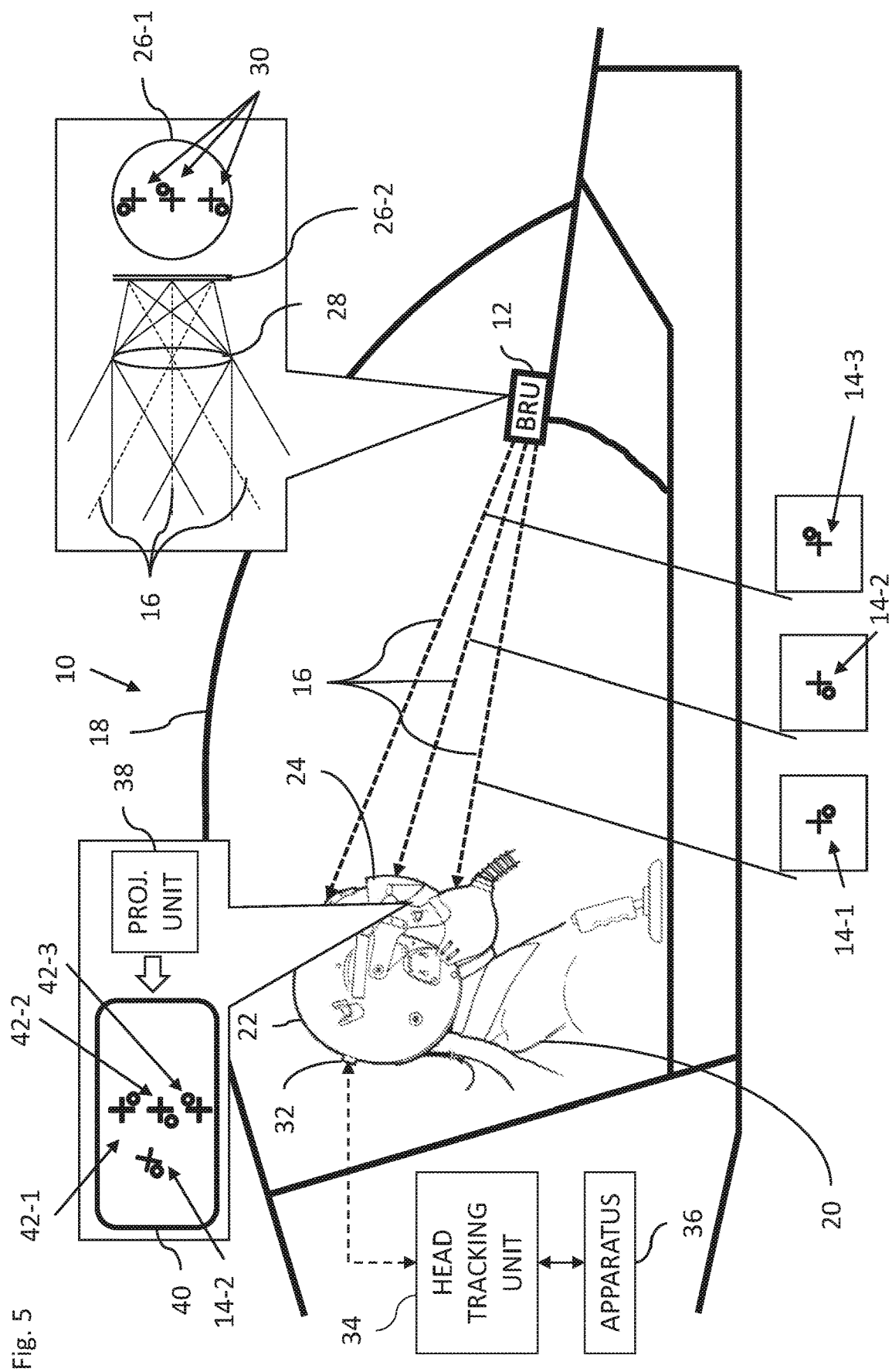
FIG. 5 is a partly pictorial, partly block diagram view of an alternative mode of operation of the head-mounted display alignment system of FIG. 1.

In embodiments of the presently disclosed subject matter, fewer, more and/or different stages than those shown in FIGS. 4 and 7 may be executed. In embodiments of the presently disclosed subject matter one or more stages illustrated in FIGS. 4 and 7 may be executed in a different order and/or one or more groups of stages may be executed simultaneously. FIGS. 1, 3, and 5 illustrate a general schematic of the system architecture in accordance with an embodiment of the presently disclosed subject matter. Each module in FIGS. 1, 3, and 5 can be made up of any combination of software, hardware and/or firmware that performs the functions as defined and explained herein. The modules in FIGS. 1, 3, and 5 may be centralized in one location or dispersed over more than one location. In other embodiments of the presently disclosed subject matter, the system may comprise fewer, more, and/or different modules than those shown in FIGS. 1, 3, and 5.

It is to be noted that, with reference to each of the flowcharts of FIGS. 4 and 7, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flowchart is described also with reference to the system elements that realizes them, this is by no means binding, and the blocks can be performed by elements other than those described herein.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

It was mentioned above, in the background section, that one method used to align a head-mounted display with a platform and therefore a head-mounting, is for the operator to align two symbols in the head-mounted display. One of the symbols is projected by a boresight reticle unit (BRU) or similar optical device disposed on the platform, and one of the symbols is projected by a projection unit of the head-mounted display. Once the two symbols are aligned, knowledge of the alignment of the symbols may be used to align the head-mounted display with the coordinate system of the platform. The symbol projected by the BRU is projected in a single direction and it therefore cannot be guaranteed that the symbol projected by the BRU will automatically be seen by the operator, especially if the operator is taller or shorter than average, without the operator having to move his/her head around until the symbol projected by the BRU is seen in the head-mounted display.

Bearing this in mind, reference is now made to FIG. 1, which is a partly pictorial, partly block diagram view of a head-mounted display alignment system 10 constructed and operative in accordance with an embodiment of the present disclosure. The head-mounted display alignment system 10 includes at least one optical apparatus 12 disposed in a platform 18. An operator 20 of the platform 18 is shown in FIG. 1 wearing a head-mounting 22 (e.g. helmet) which includes a head-mounted display 24. The at least one optical apparatus 12 is configured to generate a plurality of symbols 14 which are projected as collimated beams 16 in a plurality of different directions so that the symbols 14 are projected by the at least one optical apparatus 12 to a plurality of different viewing angles. The symbols 14 are individually labeled as 14-1, 14-2 and 14-3 in FIG. 1 for the sake of clarity. Projecting more than one symbol 14 enhances the likelihood that one of the symbols 14 is projected into the head-mounted display 24 without the operator 20 having to move his/her head around (or having to move his/her head around less) until one of the symbols 14 projected by the at least one optical apparatus 12 is seen in the head-mounted display 24.

FIG. 1 shows three symbols 14 being projected by the at least one optical apparatus 12 into three different directions. It will be appreciated that the at least one optical apparatus 12 may be configured to project more than three symbols 14 in different directions which may further enhance the likelihood that one of the symbols 14 is projected into the head-mounted display 24 without the operator 20 having to move his/her head around until one of the symbols 14 projected by the at least one optical apparatus 12 is seen in the head-mounted display 24.

The at least one optical apparatus 12 may include one or more BRUs or any one or more other optical arrangements for generating the symbols 14. In the example of FIG. 1, the at least one optical apparatus 12 is shown schematically as a BRU including a reticle 26, and a lens 28. The BRU also includes a light source (not shown). The reticle is shown in a plane view (reference numeral 26-1) and in a cross-sectional view (reference numeral 26-2). The reticle 26 includes three symbols 30 corresponding to the generated symbols 14. The reticle 26 is shown as being disposed at the focal point of the lens 28 thereby causing the BRU to generate the symbols 14 (from the symbols 30) in the three collimated beams 16 in three different directions. The lens 28 may optionally be replaced by a beam splitter and other suitable optical components. In accordance with an alternative embodiment, the at least one optical apparatus 12 may include a plurality of BRUs configured to generate the symbols 14.

The head-mounting 22 may include a movement sensor 32 so that the movement of the head-mounting 22 may be tracked by a head tracking unit 34. The head tracking unit 34 may be disposed in the head-mounting 22, the platform 18, in any other suitable location, or in any suitable combination thereof. The head-mounted display alignment system 10 may also include an apparatus 36 which aligns the head-mounting 22 with a coordinate system of the platform 18. The apparatus 36 may be disposed in the head-mounting 22, the platform 18, in any other suitable location, or in any other suitable combination thereof. The apparatus 36 is described in more detail with reference to FIG. 2.

The head-mounted display 24 includes a projection unit 38 and a screen 40. The projection unit 38 is configured to project a symbol 42 on to the screen 40 of the head-mounted display 24. The operator 20 moves his/her head to align the symbol 42 projected by the projection unit 38 with one of the symbols 14 (the symbol 14-2) projected by the at least one optical apparatus 12.

It should be noted that the symbol 42 and the symbols 14 generally have a two-dimensional format that allows for roll alignment between the symbol 42 and one of the symbols 14. In other words, the symbols 42, 14 are designed so that an angular orientation of the symbols 42, 14 may be identified and aligned by the operator 20.

Figure 2:
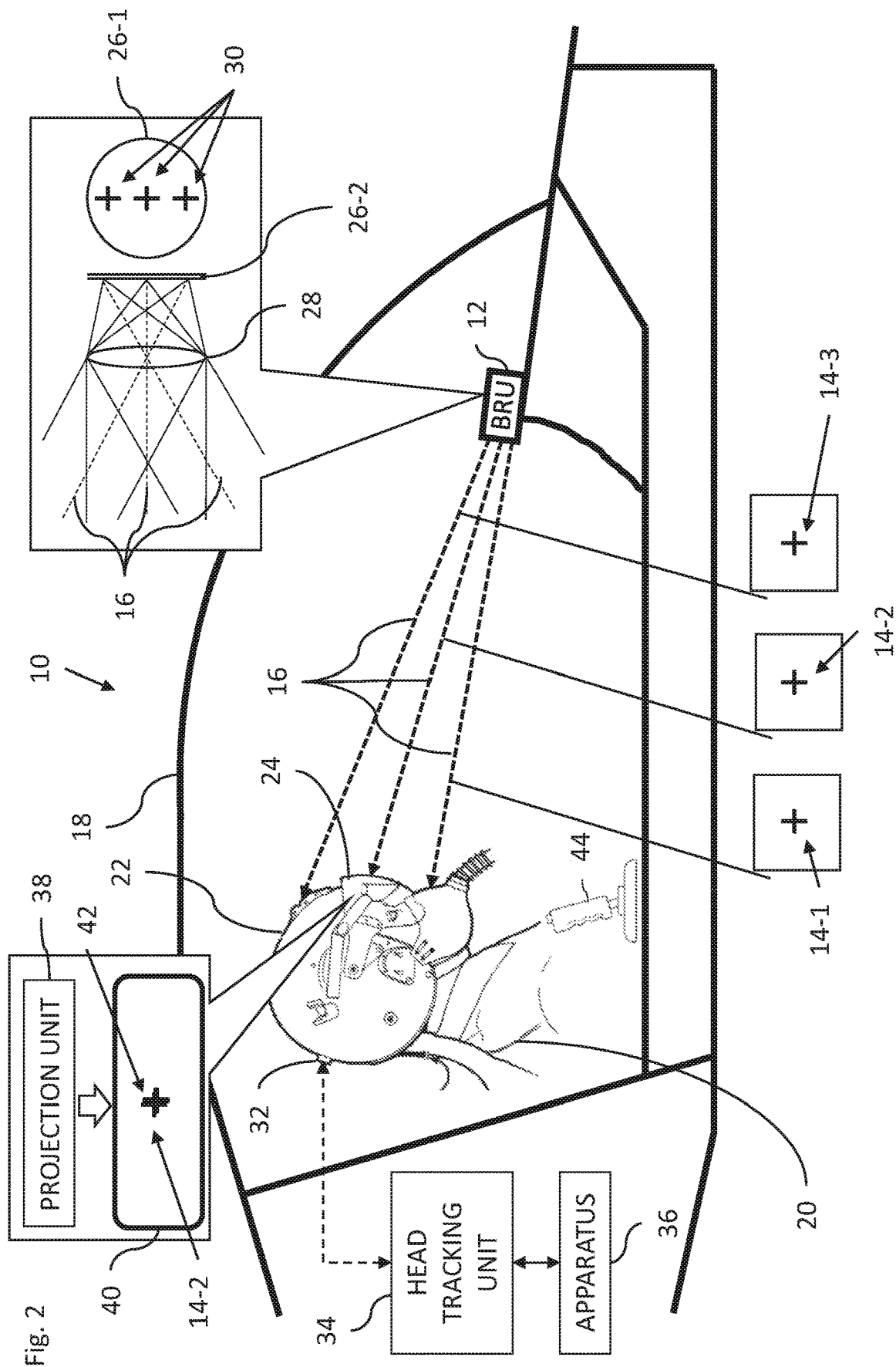
FIG. 2 is a partly pictorial, partly block diagram view of the head-mounted display alignment system of FIG. 1 showing symbol alignment.

Reference is now made to FIG. 2, which is a partly pictorial, partly block diagram view of the head-mounted display alignment system 10 of FIG. 1 showing symbol alignment. FIG. 2 shows that the operator 20 has moved his/her head so that the symbol 42 and the symbol 14-2 are almost, but not completely, aligned. The operator 20 then performs a selection action to confirm the alignment of the symbol 42 and the symbol 14-2. The selection action may be performed via an input device 44, for example, by pressing a button. The input device 44 is shown in FIG. 2 as a joystick. It will be appreciated that the input device 44 may additionally, or alternatively, include a voice activated device for receiving a voice input selection and/or a visual input device for receiving a gesture-based input selection such as a hand gesture or eye movement, by way of example only.

Upon the operator 20 confirming the alignment of the symbol 42 and the symbol 14-2, the apparatus 36 aligns the head-mounted display 24 with the coordinate system of the platform 18 and the head-mounting 22. In order to perform the alignment of the head-mounted display 24 with the coordinate system of the platform 18, the apparatus 36 determines which one of the symbols 14 is being shown in the screen 40 of the head-mounted display 24. The head tracking unit 34 tracks the orientation of the head-mounting 22 which in turn gives an approximate orientation of the head-mounted display 24. The approximate orientation of the head-mounted display 24 is generally sufficient to determine which one of the symbols 14 is being shown in the screen 40 of the head-mounted display 24.

After the head-mounted display 24 has been aligned with the coordinate system of the platform 18, as the operator 20 moves his/head, the symbol 42 now moves in the screen 40 so that the symbols 42, 14-2 are still aligned as the symbol 42 is now being displayed in accordance with the coordinate system of the platform 18. The operator 20 may affect a fine tuning of the alignment using the input device 44 (or other input device) to move the symbol 42 with respect to the symbol 14-2. Once the fine tuning has been performed by the operator 20 the operator may confirm the fine tuning using the input device 44 or any other suitable device.

Reference is now made to FIG. 3, which is a block diagram view of the apparatus 36 for use in the system 10 of FIG. 1. Reference is also made to FIG. 2. The apparatus 36 includes an interface 46, a data bus 48, a processing resource 50, and a memory 52. The interface 46 is configured to enable data transfer between the apparatus 36 and elements external to the apparatus 36, for example, but not limited to, the head tracking unit 34, the input device 44, and/or the at least one optical apparatus 12. It should be noted that the head tracking unit 34 may be implemented as part of the apparatus 36 and share use of the processing resource 50. The memory 52 is configured to store data used by the processing resource 50. The processing resource 50 is described in more detail with reference to FIGS. 4 and 7. The data bus 48 is configured to connect the various elements of the apparatus 36 for data transfer purposes.

Reference is now made to FIG. 4, which is a flowchart 54 including exemplary steps in a method of operation of the system 10 of FIG. 1. Reference is also made to FIG. 2. The processing resource 50 (FIG. 3) is configured to obtain (block 56) an indication of a confirmation, by the operator 20 of the platform 18, of an alignment of one symbol 14 of the plurality of symbols 14 with the symbol 42 as viewed in the head-mounted display 24 of the head-mounting 22 worn by the operator 20. The processing resource 50 is configured to obtain (block 58) orientation data of the head-mounting 22 from the head tracking unit 34 of the head-mounting 22. The processing resource 50 is configured to determine (block 60) which symbol 14 of the plurality of symbols 14 was aligned by the operator 20 with the symbol 42 at least based on the orientation data of the head-mounting 22, thereby yielding that the symbol 14-2 of the plurality of symbols 14 was the one aligned by the operator 20 with the symbol 42. The processing resource 50 is configured to perform (block 62) an alignment of the head-mounted display 24 and the coordinate system of the platform 18 at least based on orientation data of the symbol 14-2 and orientation data of the symbol 42. The processing resource 50 is configured to perform (block 64) an alignment of the head-mounting 22 and the head-mounted display 24 based on the alignment of the platform 18 and the head-mounted display 24 which is based on orientation data of the symbol 14-2 and orientation data of the symbol 42.

In accordance with an alternative embodiment, the at least one optical apparatus 12 may be configured to selectively generate one of the symbols 14 according to an estimation of the orientation of the head-mounted display 24 based on the orientation of the head-mounting 22. In other words, as the orientation of the head-mounting 22 is tracked by the head tracking unit 34, the orientation of the head-mounted display 24 may be estimated based on the orientation of the head-mounting 22. The at least one optical apparatus 12 is then configured to generate one of the symbols 14 to project onto the screen 40 of the head-mounted display 24 based on the estimated orientation of the head-mounted display 24. The operator 20 then proceeds to align the symbol 42 and the symbol 14 in the screen 40 as described herein above. In accordance with this alternative embodiment, the at least one optical apparatus 12 may be implemented as a plurality of BRUs pointing in different directions, the BRUs being selectively actuated according to where the symbol 14 is to be projected. Alternatively, the at least one optical apparatus 12 may be implemented as a single BRU which has optical elements (e.g., prisms and/or mirrors) which may be actuated to move the symbol 14 to a desired direction, and/or the BRU may be mounted of a moving platform to move the symbol 14 to the desired direction.

Reference is now made to FIG. 5, which is a partly pictorial, partly block diagram view of an alternative mode of operation of the head-mounted display alignment system 10 of FIG. 1. The alternative mode of operation is substantially the same as the mode of operation of the head-mounted display alignment system 10 as described above with reference to FIGS. 1-4 except for the following differences described below with reference to FIGS. 5-7.

In FIG. 5, the projection unit 38 projects a plurality of different symbols 42 (labeled individually as 42-1, 42-2 and 42-3) on to the screen 40 of the head-mounted display 24. Similarly, each of the symbols 30 included in the reticle 26 are different and therefore the at least one optical apparatus 12 generates different symbols 14 in the collimated beams 16 which are projected at different viewing angles. Each of the symbols 42 has a different format and corresponds to a format of one symbol 14 of the plurality of symbols 14 projected from the at least one optical apparatus 12. The symbol 14 which is seen in the screen 40 by the operator 20 is aligned by the operator 20 with one of the symbol 42 that matches the symbol 14 that is seen in the screen 40. The different format of the symbols 14, 42 may include using a different color format and/or a different shape format for the different symbols 14, 42.

Figure 6:
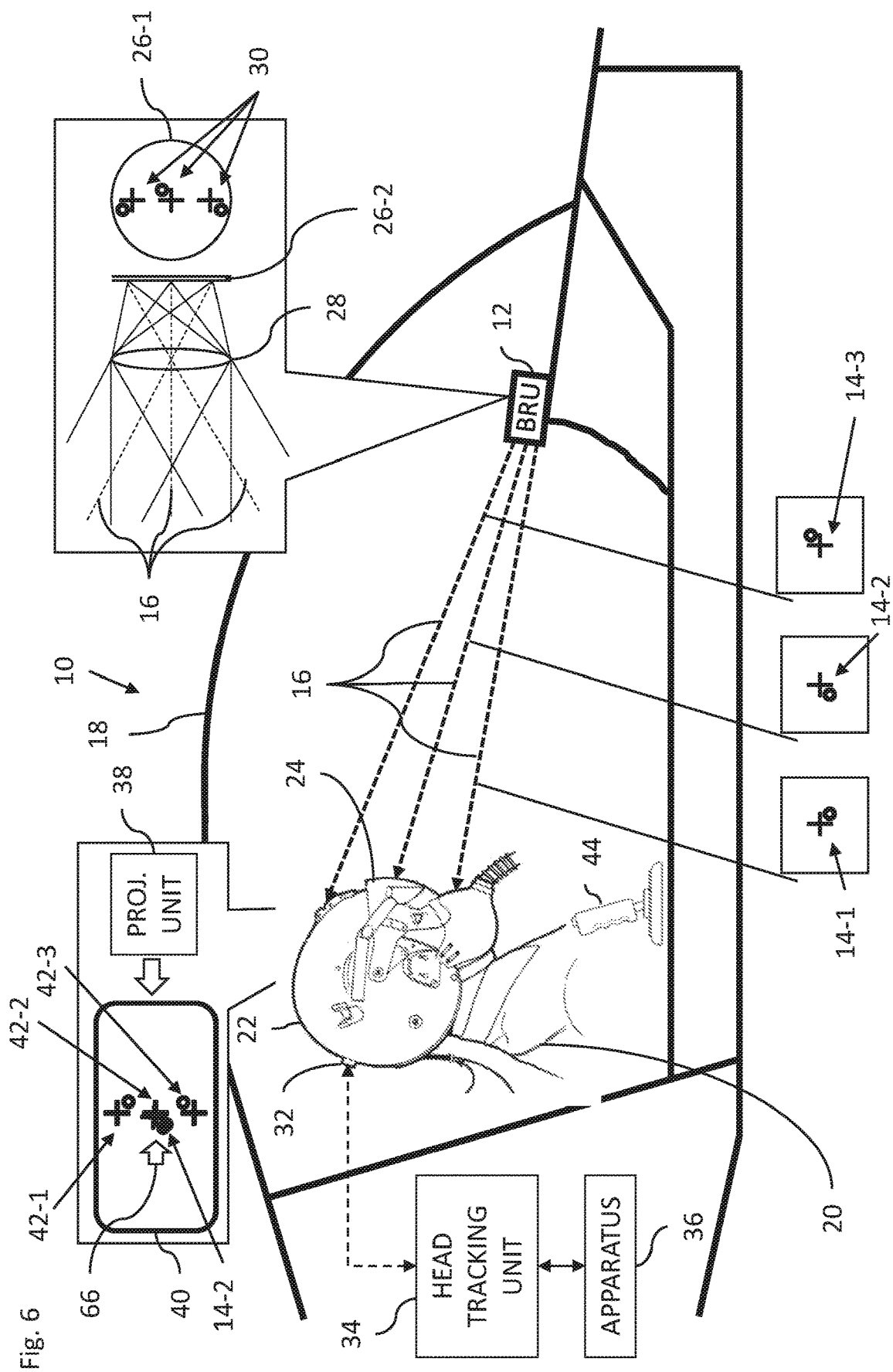
FIG. 6 is a partly pictorial, partly block diagram view symbol alignment in the alternative mode of operation of the system of FIG. 1.

Reference is now made to FIG. 6, which is a partly pictorial, partly block diagram view of symbol alignment in the alternative mode of operation of the system 10 of FIG. 1. FIG. 6 shows that the operator 20 has moved his/her head so that the symbol 42-2 and the symbol 14-2 are almost, but not completely, aligned. It will be appreciated that symbol 42-2 and symbol 14-2 have matching formats and for that reason the operator 20 aligned symbol 14-2 with symbol 42-2. The operator 20 then performs a first selection action to confirm the alignment of the symbol 42-2 and the symbol 14-2. The first selection action may be performed via the input device 44.

In order to perform the alignment of the head-mounted display 24 with the coordinate system of the platform 18, the apparatus 36 also has to determine which one of the symbols 14 is being shown in the screen 40 of the head-mounted display 24. To this end, the operator 20 selects one of the symbols 42 which matches the symbol 14 in the screen 40 in order to indicate which one of the symbols 14 is being shown in the screen 40 of the head-mounted display 24. Therefore, the apparatus 36 instructs the projection unit 38 to add a symbol 66 to the screen 40 to be used as a selection symbol for selecting which one of the symbols 42 matches the symbol 14 in the screen 40. The symbol 66 may be moved up and down (or left and right, depending on the configuration of the symbols 42 on the screen 40) using a suitable input device, for example, the input device 44. Once the symbol 66 is aligned with the desired one of symbols 42, the operator 20 may make a second selection action using a suitable input device, for example, the input device 44. The apparatus 36 determines which one of the symbols 14 is being seen in the screen 40 based on the position of the symbol 66 when the operator 20 performs the second selection action. In FIG. 6, the symbol 66 has been shown as an arrow. It will be appreciated that the symbol 66 may be any suitable format, for example, but not limited to, encircling one of the symbols 42. Similarly, the symbol 66 may be implemented by changing the color and/or intensity of a selected one of the symbols 42. It will also be appreciated that the relevant symbol 42 may be selected using other methods. For example, numbers (e.g., 1, 2, 3) or letters (e.g., A, B, C) may be displayed on the screen 40, and the operator 20 selects the number or letter next to the relevant symbol 42. Alternatively, the relevant symbol 42 may be selected based on a voice input, e.g., "top symbol", "middle symbol", or "bottom symbol".

The apparatus 36 aligns the head-mounted display 24 with the coordinate system of the platform 18 and the head-mounting 22 based on the orientation of the symbol 42-2 and the symbol 14-2 at the time when the operator 20 confirmed the alignment of the symbol 42-2 and the symbol 14-2 using the first selection action. Therefore, the apparatus 36 saves the orientation data of all the symbols 42 at the time when the operator 20 confirmed the alignment of the symbol 42-2 and the symbol 14-2 with the first selection action. When it is later determined, based on the second selection action using the symbol 66, which one of the symbols 42 matches the symbol 14 seen in the screen 40, the orientation data of the relevant matching symbol 42 (in this example symbol 42-2) may retrieved and used in the alignment of the head-mounted display 24 with the coordinate system of the platform 18 and the head-mounting 22 based on the orientation of the symbol 42-2 and the symbol 14-2.

After the head-mounted display 24 has been aligned with the coordinate system of the platform 18, as the operator 20 moves his/her head, the symbol 42-2 now moves in the screen 40 so that the symbols 42-2, 14-2 are still aligned as the symbol 42-2 is now being displayed in accordance with the coordinate system of the platform 18. The operator 20 may now affect a fine tuning of the alignment using the input device 44 (or other input device) to move the symbol 42 with respect to the symbol 14-1. Once the fine tuning has been performed by the operator 20, the operator 20 may confirm the fine tuning using the input device 44 or any other suitable device.

Reference is now made to FIG. 7, which is a flowchart 68 including exemplary steps in the alternative mode of operation of the system of FIG. 1. Reference is also made to FIG. 6. The processing resource 50 (FIG. 3) is configured to obtain (block 70) an indication of a confirmation, by the operator 20 of the platform 18, of an alignment of one of the plurality of symbols 14 with one of the symbols 42 as viewed in the head-mounted display 24 of the head-mounting 22 worn by the operator 20. The processing resource 50 is configured to obtain (block 72) an indication of a selection by the operator 20 of the symbol 42-2 from the plurality of symbols 42 projected onto the head-mounted display 24 by the projection unit 38. The selection of the symbol 42-2 from the plurality of symbols 42 indicates that the symbol 42-2 matches the symbol 14 viewed in the screen 40. The processing resource 50 is configured to determine (block 74) which symbol 14 of the plurality of symbols 14 was aligned by the operator 20 with the symbol 42-2 at least based on the selection of the symbol 42-2 by the operator 20 yielding that the symbol 14-2 of the plurality of symbols 14 as the matching symbol. The processing resource 50 is configured to perform (block 76) an alignment of the head-mounted display 24 and the coordinate system of the platform 18 at least based on orientation data of the symbol 14-2 and orientation data of the symbol 42-2. The processing resource 50 is configured to perform (block 78) an alignment of the head-mounting 22 and the head-mounted display 24 based on the alignment of the platform 18 and the head-mounted display 24 which is based on orientation data of the symbol 14-2 and orientation data of the symbol 42-2.

Reference is now made to FIG. 8, which is a view of an alternative reticle 80 for use in the system 10 of FIG. 1. Reference is also made to FIG. 1. The at least one optical apparatus 12 may include the reticle 80 instead of the reticle 26. The reticle 80 includes the symbols 30 and a plurality of arrows 82 pointing towards the symbols 30, in order to generate: the symbols 14 (corresponding to the symbols 30); and a plurality of arrow symbols (corresponding to the arrows 82) pointing in a direction of the symbols 14 to direct the operator 20 to find one of the symbols 14 in the head-mounted display 24.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising a processing resource configured to:
obtain a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display;
determine which symbol of the first plurality of symbols was aligned by the operator with the second symbol yielding a first symbol of the first plurality of symbols, the first symbol having first orientation data, the second symbol having second orientation data; and
perform an alignment of the head-mounting and the head-mounted display at least based on the first orientation data and the second orientation data.

2. The system according to claim 1, wherein the processing resource is further configured to perform another alignment of the head-mounted display and a coordinate system of the platform at least based on the first orientation data and the second orientation data.

3. The system according to claim 1, wherein the processing resource is further configured to:
obtain third orientation data of the head-mounting from a head tracking unit of the head-mounting; and
determine which symbol of the first plurality of symbols was aligned by the operator with the second symbol at least based on the third orientation data of the head-mounting.

4. The system according to claim 1, wherein the processing resource is further configured to:
obtain a second indication of a selection by the operator of the second symbol from a second plurality of symbols projected onto the head-mounted display by the projection unit, the selection of the second symbol from the second plurality of symbols indicating that the second symbol matches the first symbol; and
determine which symbol of the first plurality of symbols was aligned by the operator with the second symbol at least based on the selection of the second symbol by the operator.

5. The system according to claim 4, wherein each one of the second plurality of symbols has a different format and corresponds to a format of one symbol of the first plurality of symbols projected from the at least one optical apparatus.

6. The system according to claim 5, wherein the format may include at least one of: a color format; or a shape format.

7. The system according to claim 1, wherein the first symbol and the second symbol has a two-dimensional format that allows for roll alignment between the first symbol and the second symbol.

8. The system according to claim 1, wherein the first plurality of symbols are comprised in a plurality of collimated beams.

9. The system according to claim 1, wherein the at least one optical apparatus comprises a boresight reticle unit including at least one of: a lens; or beam splitter configured to generate the first plurality of symbols.

10. The system according to claim 9, wherein the at least one optical apparatus includes a reticle configured to generate: the first symbol; and a plurality of arrow symbols pointing in a direction of the first symbol to direct the operator to find the first symbol in the head-mounted display.

11. The system according to claim 1, wherein the at least one optical apparatus comprises a plurality of boresight reticle units configured to generate the first plurality of symbols.

12. A method comprising:
obtaining a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display;

determining which symbol of the first plurality of symbols was aligned by the operator with the second symbol yielding a first symbol of the first plurality of symbols, the first symbol having first orientation data, the second symbol having second orientation data; and performing an alignment of the head-mounting and the head-mounted display at least based on the first orientation data and the second orientation data.

13. The method according to claim 12, further comprising performing another alignment of the head-mounted display and a coordinate system of the platform at least based on the first orientation data and the second orientation data.

14. The method according to claim 12, further comprising:
obtaining third orientation data of the head-mounting from a head tracking unit of the head-mounting; and
determining which symbol of the first plurality of symbols was aligned by the operator with the second symbol at least based on the third orientation data of the head-mounting.

15. The method according to claim 12, further comprising:
obtaining a second indication of a selection by the operator of the second symbol from a second plurality of symbols projected onto the head-mounted display by the projection unit, the selection of the second symbol from the second plurality of symbols indicating that the second symbol matches the first symbol; and
determining which symbol of the first plurality of symbols was aligned by the operator with the second symbol at least based on the selection of the second symbol by the operator.

16. The method according to claim 15, wherein each one of the second plurality of symbols has a different format and corresponds to a format of one symbol of the first plurality of symbols projected from the at least one optical apparatus.

17. The method according to claim 16, wherein the format may include at least one of: a color format; or a shape format.

18. The method according to claim 12, wherein the first symbol and the second symbol has a two-dimensional format that allows for roll alignment between the first symbol and the second symbol.

19. The method according to claim 12, wherein the first plurality of symbols are comprised in a plurality of collimated beams.

20. A software product, comprising a non-transient computer-readable medium in which program instructions are stored, which instructions, when read by a central processing unit (CPU), cause the CPU to:
obtain a first indication of a confirmation, by an operator of a platform, of an alignment of one symbol of a first plurality of symbols with a second symbol as viewed in a head-mounted display of a head-mounting worn by the operator, the first plurality of symbols being projected by at least one optical apparatus disposed on the platform to a plurality of different viewing angles, the second symbol being projected onto the head-mounted display by a projection unit of the head-mounted display;
determine which symbol of the first plurality of symbols was aligned by the operator with the second symbol yielding a first symbol of the first plurality of symbols, the first symbol having first orientation data, the second symbol having second orientation data; and
perform an alignment of the head-mounting and the head-mounted display at least based on the first orientation data and the second orientation data.

\* \* \* \* \*